US012576820B2

(12) United States Patent
Sano

(10) Patent No.: US 12,576,820 B2
(45) Date of Patent: Mar. 17, 2026

(54) VEHICLE

(71) Applicant: TOYOTA JIDOSHA KABUSHIKI KAISHA, Toyota (JP)

(72) Inventor: Keisuke Sano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 27 days.

(21) Appl. No.: 18/792,923

(22) Filed: Aug. 2, 2024

(65) Prior Publication Data

US 2025/0187572 A1    Jun. 12, 2025

(30) Foreign Application Priority Data

Dec. 8, 2023    (JP) ................................. 2023-207683

(51) Int. Cl.
*B60T 8/174* (2006.01)
*B60L 7/18* (2006.01)
(Continued)

(52) U.S. Cl.
CPC ............... *B60T 8/174* (2013.01); *B60L 7/18* (2013.01); *B60T 8/171* (2013.01); (Continued)

(58) Field of Classification Search
CPC ...... B60T 8/174; B60T 8/171; B60T 2240/00; B60L 7/18; B60L 2240/46; B60L 7/26; (Continued)

(56) References Cited

U.S. PATENT DOCUMENTS

| | | | | |
|---|---|---|---|---|
| 2023/0095519 A1* | 3/2023 | Hoshi | ..................... | B60L 58/12 |
| | | | | 701/22 |
| 2024/0109426 A1* | 4/2024 | Szilassy | .............. | B60W 10/184 |
| 2025/0296537 A1* | 9/2025 | Duke | ..................... | B62D 59/04 |

FOREIGN PATENT DOCUMENTS

| | | | | |
|---|---|---|---|---|
| JP | 5287134 B2 * | 9/2013 | ............... | B60L 7/24 |
| JP | 2022-014403 A | 1/2022 | | |

OTHER PUBLICATIONS

"Fail-Safe Study on Brake Blending Control" by Christoph Lehne et al., SAE International 2021-01-0983 Published Apr. 6, 2021 (Year: 2021).*

(Continued)

*Primary Examiner* — Kito R Robinson
*Assistant Examiner* — Tanya C Sienko
(74) *Attorney, Agent, or Firm* — SoraIP, Inc.

(57) ABSTRACT

The regenerative braking device applies a regenerative braking force to the regenerative braking wheel. Friction braking devices impart friction braking force to each wheel. The control device includes a temperature acquisition unit, a required braking force acquisition unit, and a braking force control unit. The temperature acquisition unit acquires the surface temperature of the regenerative braking wheel while the vehicle is running. The required braking force acquisition unit acquires the required braking force based on the brake pedal operation amount. The braking force control unit distributes the required braking force to the regenerative braking force and the friction braking force of each wheel, and controls the distribution of the regenerative braking force to the required braking force so that the surface temperature of the regenerative braking wheel does not exceed a predetermined reference temperature while the vehicle is running, based on the surface temperature acquired by the temperature acquisition unit.

1 Claim, 5 Drawing Sheets

(51) Int. Cl.
  *B60T 8/171*     (2006.01)
  *B60W 60/00*     (2020.01)

(52) U.S. Cl.
  CPC ....... *B60L 2240/46* (2013.01); *B60T 2240/00*
       (2013.01); *B60W 60/001* (2020.02); *B60W*
                    *2520/00* (2013.01)

(58) Field of Classification Search
  CPC ............. B60L 15/2009; B60W 60/001; B60W
           2520/00; B60W 30/18127; B60W
        2520/10; B60W 2530/20; B60W 2540/10;
                        B60W 2540/12
  See application file for complete search history.

(56)                References Cited

OTHER PUBLICATIONS

"A Co-Simulation Platform with Tire and Brake Thermal Model for the Analysis and Reproduction of Blanking" by F. Romagnuolo et al., Vehicles 2023 1605-1621 Published Nov. 6, 2023 (Year: 2023).*
Machine translation of JP 5287134 B2 from IP.com, downloaded Oct. 21, 2025 (Year: 2025).*
"How to Reset the Low-Tire-Pressure Indicator" https://youtu.be/Ghe-uN_tmMA?si=tce6ZHg7axyTAQku May 15, 2019 1 minute 45 seconds long, see 1:00-1:21 (Year: 2019).*

* cited by examiner

FIG. 2

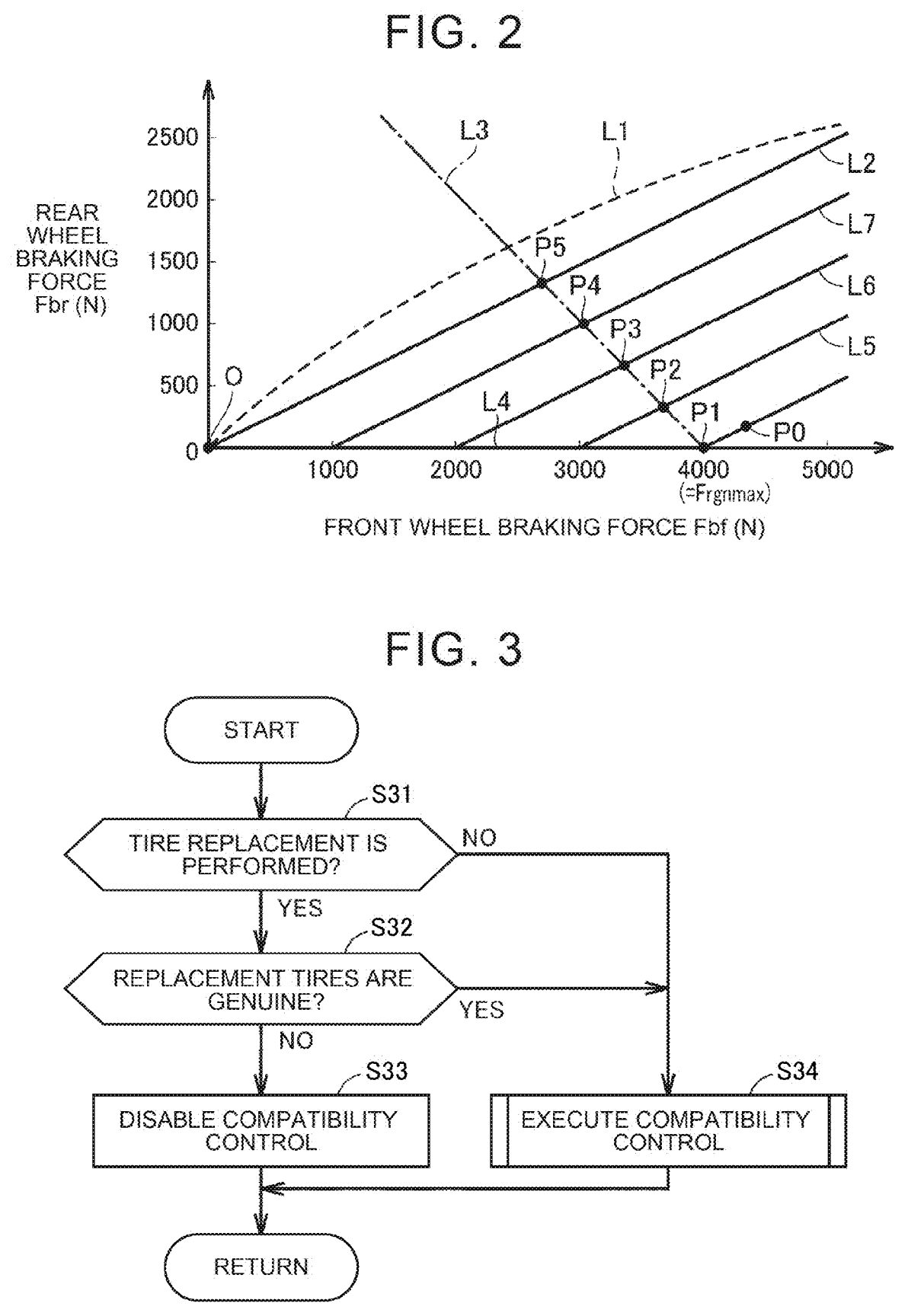

REAR WHEEL BRAKING FORCE Fbr (N)

FRONT WHEEL BRAKING FORCE Fbf (N)

FIG. 3

START

S31 TIRE REPLACEMENT IS PERFORMED?

NO

YES

S32 REPLACEMENT TIRES ARE GENUINE?

YES

NO

S33 DISABLE COMPATIBILITY CONTROL

S34 EXECUTE COMPATIBILITY CONTROL

RETURN

VEHICLE

CROSS-REFERENCE TO RELATED APPLICATION

This application claims priority to Japanese Patent Application No. 2023-207683 filed on Dec. 8, 2023, incorporated herein by reference in its entirety.

BACKGROUND

1. Technical Field

The present disclosure relates to braking control for a vehicle that includes a regenerative braking device that applies a regenerative braking force to wheels and a friction braking device that applies a friction braking force.

2. Description of Related Art

Japanese Unexamined Patent Application Publication No. 2022-14403 (JP 2022-14403 A), for example, discloses a driving force control device that controls a driving force distribution ratio between front and rear wheels so as to suppress a difference in the degree of wear of tires on the front and rear wheels in a four-wheel drive vehicle. The driving force control device sets the distribution ratio of driving forces to be generated by the front and rear wheels such that the distribution ratio of the driving force for the front wheels or the rear wheels with tires worn to a lesser degree is larger than the distribution ratio of the driving force for the other wheels with tires worn to a greater degree.

SUMMARY

A vehicle that includes a regenerative braking device that applies a regenerative braking force to wheels and a friction braking device that applies a frictional braking force is basically configured such that a regenerative braking force that is as large as possible is applied in order to increase the amount of power to be recovered during braking.

Since the distribution of the braking force to the wheels to which the regenerative braking force is applied increases, however, the tire surface temperature and the slip ratio of the wheels increase due to the concentration of the stress on the wheels, and consequently, the wear of the tires is accelerated. The increase in the amount of wear of the tires increases the amount of dust discharged due to the wear of the tires, which may affect the environment.

The present disclosure has been made in view of the above issue, and it is an object of the present disclosure to achieve both suppression of tire wear dust and improvement of fuel efficiency in a vehicle that includes a regenerative braking device that applies a regenerative braking force to wheels and a friction braking device that applies a friction braking force.

An aspect provides a vehicle including a plurality of wheels including a regenerative braking wheel, a regenerative braking device, a friction braking device, and a control device.

The regenerative braking device applies a regenerative braking force to the regenerative braking wheel.

The friction braking device applies a friction braking force to the wheels.

The control device controls a braking force for the vehicle.

The control device includes a temperature acquisition unit, a required braking force acquisition unit, and a braking force control unit.

The temperature acquisition unit acquires a surface temperature of the regenerative braking wheel during travel of the vehicle. The required braking force acquisition unit acquires a required braking force based on a brake pedal operation amount. The braking force control unit distributes the required braking force to the regenerative braking force and the friction braking force for the wheels.

The braking force control unit controls distribution of the regenerative braking force to the required braking force based on the surface temperature of the regenerative braking wheel acquired by the temperature acquisition unit such that the surface temperature of the regenerative braking wheel does not exceed a reference temperature determined in advance during travel of the vehicle.

According to the present disclosure, it is possible to achieve both suppression of tire wear dust and improvement in fuel efficiency in a vehicle that includes a regenerative braking device that applies a regenerative braking force to wheels and a friction braking device that applies a friction braking force.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram illustrating a distribution ratio between a front wheel braking force and a rear wheel braking force;

FIG. 3 is a flowchart illustrating an example of a process related to braking control according to the present embodiment;

DETAILED DESCRIPTION OF EMBODIMENTS

Figure 1:
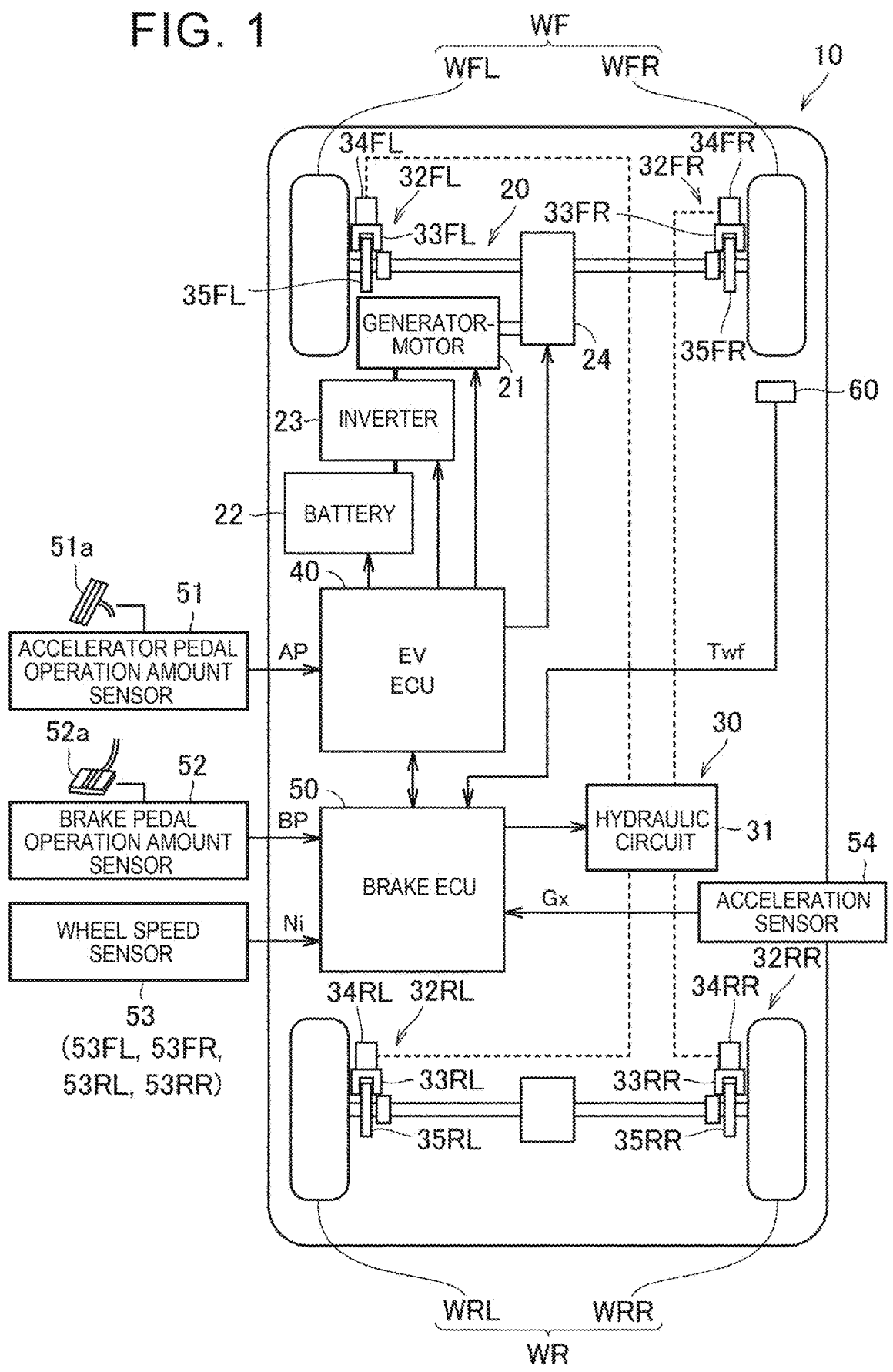
FIG. 1 is a diagram schematically illustrating a configuration of a vehicle according to an embodiment of the present disclosure.

Hereinafter, an embodiment of the present disclosure will be described in detail with reference to the drawings. In the drawings, the same or corresponding parts are denoted by the same reference numerals, and the description thereof will not be repeated.

Vehicle Configuration

FIG. 1 is a diagram schematically illustrating a configuration of a vehicle 10 according to an embodiment of the present disclosure. As shown in FIG. 1, a vehicle 10 is an electrified vehicle. Electrified vehicle may be any vehicles that use the electric power of the battery 22 as a power source. Electrified vehicle is, for example, battery electric vehicle (hereinafter also referred to as "battery electric vehicle (BEV)"), or plug-in hybrid electric vehicle (hereinafter also referred to as "plug-in hybrid vehicle (PHEV)"). Hereinafter, the electronic control unit is also referred to as an "ECU".

The vehicle 10 includes a plurality of wheels (tires), a regenerative braking device 20, a friction braking device 30, an EV ECU 40, and a brake ECU 50. ECU is an electronic control circuitry with a microcomputer as its main components, including a central processing unit (CPU), read only memory (ROM), random access memory (RAM), non-volatile memory, and an interface (I/F). CPU realizes various functions to be described later by executing programs stored in ROM. EV ECU 40 and the brake ECU 50 may be coupled to one ECU.

The plurality of wheels includes a left front wheel WFL, a right front wheel WFR, a left rear wheel WRL, and a right rear wheel WRR. In the following explanation, the left front wheel WFL and the right front wheel WFR are collectively referred to as "front wheel WF", and the left rear wheel WRL and the right rear wheel WRR are collectively referred to as "rear wheel WR". In the present embodiment, the vehicle 10 is assumed to be a four-wheel vehicle driven by a front wheel, but the number of wheels and the driving method can be changed as appropriate. For example, the drive system may be a rear-wheel drive or a four-wheel drive.

The regenerative braking device 20 includes a motor generator 21, a battery 22, an inverter 23, and a transmission 24. The motor generator 21 includes an AC synchronous motor. The output shaft of the motor generator 21 is connected to the left front wheel WFL and the right front wheel WFR via a transmission 24 so as to transmit power. The regenerative braking device 20 also functions as a driving device that drives the front wheel WF when the accelerator pedal 51a is depressed.

The battery 22 is constituted by a secondary battery such as a lithium ion battery that can be repeatedly charged and discharged. The secondary battery is not limited to a lithium ion battery, and may be another secondary battery (for example, a nickel metal hydride battery). As the secondary battery, an electrolyte-type secondary battery may be employed, or an all-solid-type secondary battery may be employed.

The inverter 23 is electrically connected to the motor generator 21 and the battery 22. When the motor generator 21 operates as a generator, the rotational (operating) energy of the front wheel WF is converted into electric energy by the motor generator 21. The inverter 23 converts AC power supplied from the motor generator 21 into DC power and supplies the DC power to the battery 22, thereby charging the battery 22. At this time, a braking torque (regenerative braking force) based on the regenerative force is applied to the front wheel WF. On the other hand, when the motor generator 21 operates as an electric motor, the inverter 23 converts DC power supplied from the battery 22 into AC power and supplies the AC power to the motor generator 21. As a result, the motor generator 21 is driven, and a driving torque (driving force) is applied to the front wheel WF.

As described above, the motor generator 21 is a braking actuator that applies a regenerative braking force to the front wheel WF, and is a driving actuator that applies a driving force to the front wheel WF. The braking by the regenerative braking device 20 is also referred to as "regenerative braking".

The friction braking device 30 includes a hydraulic circuit 31 and frictional braking mechanisms 32FL, 32FR, 32RL, 32RR. Hereinafter, with respect to the elements provided for each wheel, a subscript FL indicating the left front wheel WFL, a subscript FR indicating the right front wheel WFR, a subscript RL indicating the left rear wheel WRL, and a subscript RR indicating the right rear wheel WRR are attached at the end of the symbol. However, if the wheel positions are not specified for the elements provided for each wheel, the indices are omitted.

The hydraulic circuit 31 is provided between a master cylinder (not shown) that pressurizes the hydraulic oil by the pedaling force of the brake pedal 52a and a frictional braking mechanism 32 provided on each of the left front wheel WFL, the right front wheel WFR, the left rear wheel WRL, and the right rear wheel WRR. The hydraulic circuit 31 includes a reservoir (not shown), an oil pump, and various valve devices, and functions as a brake actuator. The hydraulic circuit 31 supplies the pressure of the hydraulic fluid (hereinafter, also referred to as "hydraulic pressure") to the wheel cylinders 34FL, 34FR, 34RL, and 34RR built in the brake calipers 33FL, 33FR, 33RL, and 33RR of the frictional braking mechanism 32. When the wheel cylinders 34FL, 34FR, 34RL, and 34RR are actuated by the hydraulic pressure, a brake pad (not shown) is pressed against the brake disc 35 (35FL, 35FR, 35RL, and 35RR) to generate a frictional braking force Ffrc. The braking by the friction braking device 30 is also referred to as "frictional braking".

EV ECU 40 is connected to each other by brake ECU 50 and controller area network (CAN) communication. EV ECU 40 is electrically connected to various sensors including the accelerator pedal operation amount sensor 51, and receives the signals outputted from these sensors. The accelerator pedal operation amount sensor 51 outputs a signal indicating an operation amount (hereinafter, also referred to as "accelerator operation amount") AP of an accelerator pedal 51a operable by a driver. EV ECU 40 is electrically connected to the regenerative braking device 20. EV ECU 40 generates a control signal for controlling the regenerative braking device 20 based on the accelerator operation amount AP and a shift lever (not shown), and transmits the generated control signal to the regenerative braking device 20.

The brake ECU 50 is electrically connected to the brake pedal operation amount sensor 52, the wheel speed sensor 53 (53FL, 53FR, 53RL, 53RR), and the acceleration sensor 54, and receives an output signal from the sensor. The brake pedal operation amount sensor 52 outputs a signal indicating an operation amount (hereinafter, also referred to as "brake pedal operation amount") BP of the brake pedal 52a.

The brake ECU 50 calculates a required braking torque Tr* based on the brake pedal operation amount BP and the vehicle speed SPD, and calculates a required braking force Freq by a product of the required braking torque Tr* and the front wheel WF of the driving radius r. The vehicle speed SPD is calculated, for example, as the mean of the wheel speeds Vwfl, Vwfr, Vwrl, Vwrr of the respective wheels acquired from the wheel speed sensor 53.

As described below, the brake ECU 50 allocates the required braking force Freq to a target value of the regenerative braking force Frgn (hereinafter, also referred to as "target regenerative braking force") Frgnt, a target value of the front wheel friction braking force Ffrcf (hereinafter, also referred to as "target front wheel friction braking force") Ffrcft, and a target value of the rear wheel friction braking force Ffrcr (hereinafter, also referred to as "target rear wheel friction braking force") Ffrcrt. The brake ECU 50 applies a regenerative braking force Frgn equal to the target regenerative braking force Frgnt to the front wheel WF using the regenerative braking device 20. The brake ECU 50 applies the front wheel friction braking force Ffrcf equal to the target front wheel friction braking force Ffrcft to the front wheel WF by controlling the braking pressures of the wheel cylinders 34FL and 34FR, respectively. The brake ECU 50 applies a rear wheel friction braking force Ffrcr equal to the target rear wheel friction braking force Ffrcrt to the rear wheel WR by controlling the braking pressures of the wheel cylinders 34RL and 34RR, respectively.

The wheel speed sensor 53 outputs a wheel speed signal Ni corresponding to the rotational speed of the corresponding wheel. The acceleration sensor 54 outputs a signal indicating a vehicle acceleration signal Gx which is a longitudinal acceleration of the vehicle 10.

Braking Control

As described above, in the vehicle 10 according to the present embodiment, the regenerative braking force Frgn by the regenerative braking device 20 is applied to the front wheel WF, and the frictional braking force Ffrc by the friction braking device 30 is applied to the front wheel WF and the rear wheel WR. In order to recover as much regenerative power as possible when the driver operates the brake pedal 52a while the vehicle 10 is traveling, the brake ECU 50 basically preferentially allocates the required braking force Freq corresponding to the operation to the regenerative braking force Frgn rather than the frictional braking force Ffrc. In one aspect, when the regenerative braking force Frgn applied (distributed) to the front wheel WF exceeds the maximum regenerative braking force (hereinafter also referred to as "maximum regenerative braking force") Frgnmax that can be generated by the regenerative braking device 20, the brake ECU 50 applies a frictional braking force Ffrc to the front wheel WF and the rear wheel WR in addition to the maximum regenerative braking force Frgnmax. The maximum regenerative braking force Frgnmax mainly depends on the power converting capability of the inverter 23.

Next, referring to FIG. 2, how to distribute the braking force when the driver operates the brake pedal 52a to decelerate the vehicle 10 while the vehicle 10 is traveling will be described. FIG. 2 is a diagram illustrating a distribution ratio of a braking force (hereinafter, also referred to as "front wheel braking force") Fbf applied to the front wheel WF and a braking force (hereinafter, also referred to as "rear wheel braking force") Fbr applied to the rear wheel WR.

In FIG. 2, the curve L1 is a line representing a distribution ratio based on the grounding weight ratio of the front wheel WF and the rear wheel WR, and is referred to as a "ideal braking force distribution line L1". The straight line L2 is a line representing the actual braking force distribution ratio, and is referred to as a "normal braking distribution line L2". The normal braking distribution line L2 is set so that the ratio of the front wheel braking force Fbf to the rear wheel braking force Fbr is larger than the ratio of the front wheel braking force Fbf to the rear wheel braking force Fbr on the ideal braking force distribution line L1. As a result, it is possible to suppress the behavior of the vehicle 10 from becoming unstable due to the rear wheel WR being locked before the front wheel WF.

The straight line L3 is referred to as an "isodeceleration line L3", in which a point where the sum (Fbf+Fbr) of the front wheel braking force Fbf and the rear wheel braking force Fbr is equal is connected by the same line. In FIG. 2, the point on the isodeceleration line L3 is that the sum of the front wheel braking force Fbf and the rear wheel braking force Fbr is 4000 N.

The brake ECU 50 is configured to execute regenerative braking by the regenerative braking device 20 in preference to the frictional braking by the friction braking device 30 in order to improve fuel efficiency (to recover electric power as much as possible). Therefore, when the brake pedal 52a is depressed, only the front wheel braking force Fbf is increased along the regenerative braking distribution line L4 (that is, along the horizontal axis) from the starting point O of the chart shown in FIG. 2. In the embodiment of FIG. 2, the largest regenerative braking force Frgnmax is 4000 N. In an aspect, when the required braking force Freq by the driver is 5000 N, when the front wheel braking force Fbf reaches 4000 N, the brake ECU 50 generates the frictional braking force Ffrc while maintaining the regenerative braking force Frgn. Therefore, the regenerative braking distribution line L4 extends until the frictional braking force Ffrc becomes 1000 N at the same inclination as the normal braking distribution line L2 when the front wheel braking force Fbf exceeds 4000 N (to the point P0).

In the following explanation, the distribution of the regenerative braking force Frgn and the frictional braking force Ffrc based on the normal braking distribution line L2 is referred to as "normal distribution". In the normal distribution, the brake ECU 50 distributes the required braking force Freq to the front wheel braking force Fbf and the rear wheel braking force Fbr according to the ratio represented by the normal braking distribution line L2. Then, the brake ECU 50 distributes the front wheel braking force Fbf to the target regenerative braking force Frgnt and the target front wheel friction braking force Ffrcft, and sets all of the rear wheel braking force Fbr to the target rear wheel friction braking force Ffrcrt.

On the other hand, the distribution of the regenerative braking force Frgn and the frictional braking force Ffrc based on the regenerative braking distribution line L4 is referred to as "regenerative improvement distribution". In the regenerative improvement distribution, the brake ECU 50 preferentially distributes the required braking force Freq to the regenerative braking force Frgn rather than the frictional braking force Ffrc. According to the regeneration improvement distribution, since a large amount of regenerative electric power can be recovered when the driver operates the brake pedal 52a, the fuel efficiency of the vehicle 10 can be improved. However, on the other hand, in the regenerative improvement distribution, the distribution of the braking force applied to the front wheel WF, which is the regenerative braking wheel, is larger than the distribution of the braking force applied to the rear wheel WR in comparison with the normal distribution. Therefore, due to the concentration of stresses in the front wheel WF, the surface-temperature and slip-rate of the tires constituting the front wheel WF are increased, and consequently tire wear is promoted. The amount of wear of the tire is typically expressed as the amount of wear from a new condition (the amount of reduction in tire radii), and by applying the regenerative enhancement distribution, even if the required braking force Freq is the same, the amount of wear of the tire is increased compared to the normal distribution. Increasing the amount of wear of the tire increases the amount of dust discharged due to the wear of the tire.

In order to deal with such concerns, in the present embodiment, as will be described below, the brake ECU 50 acquires the tire surface temperature Twf of the front wheel WF (regenerative braking wheels) while the vehicle 10 is traveling. Based on the acquired tire surface temperature Twf, the distribution of the regenerative braking force Frgn in the required braking force Freq is controlled so that the tire surface temperature Twf does not exceed a predetermined reference temperature Tref. The "reference temperature Tref" is a surface temperature at which wear of the tire is likely to occur, and mainly depends on components and properties of the tread rubber of the tire. The reference temperature Tref can be preset by a manufacturer or the like of the vehicle 10 by testing, simulating, or the like, and stored in ROM of the brake ECU 50.

Returning to FIG. 1, the vehicle 10 further includes a temperature sensor 60 as a configuration for detecting a surface temperature Twf of a tire of the front wheel WF. The temperature sensor 60 is provided in the vicinity of the front wheel WF to detect the tire surface temperature Twf of the front wheel WF, and outputs a signal indicating the detected value to the brake ECU 50. Note that the temperature sensor 60 may be installed in each of the left front wheel WFL and the right front wheel WFR. The obtained averages of the tire surface temperature Twfr of the right front wheel WFR and the tire surface temperature Twfl of the left front wheel WFL are calculated as the tire surface temperature Twf of the front wheel WF.

The brake ECU 50 can be configured to estimate the tire surface temperature Twf from the travel result of the vehicle 10 instead of acquiring the detected value of the tire surface temperature Twf from the temperature sensor 60. The travel result of the vehicle 10 includes information on the travel distance and the travel condition of the vehicle 10. The traveling conditions of the vehicle 10 include information indicating the traveling route, the vehicle speed, the weather, the outside air temperature, and the like of the vehicle 10. The driving conditions of the vehicle 10 can be acquired by using, for example, a global positioning system (GPS). For example, the brake ECU 50 estimates the present tire surface temperature Twf by applying the present travel result of the vehicle 10 to the look-up table MapTwf defining the relation between the travel result of the vehicle 10 and the tire surface temperature Twf. The look-up table MapTwf is determined in advance by experimentation, simulations, and the like, and is stored in ROM of the brake ECU 50.

The brake ECU 50 controls the distribution of the regenerative braking force Frgn in the required braking force Freq between the normal distribution and the regenerative improvement distribution in accordance with the tire surface temperature Twf of the front wheel WF, thereby achieving both suppression of tire wear dust and improvement of fuel consumption. In the following description, such braking control is also referred to as "compatibility control". The methods of distributing the braking force to the front wheel WF and the rear wheel WR in the compatibility control will be described referring to FIG. 2.

In FIG. 2, a plurality of straight lines L5 to L7 is shown between the normal braking distribution line L2 and the regenerative braking distribution line L4. From the straight lines L5, L7 are lines representing the distribution ratios of the front wheel braking force Fbf and the rear wheel braking force Fbr in the compatibility control, and is referred to as "L7 from the compatible braking distribution line L5". L7 from the compatible braking distribution line L5 has the same inclination as the normal braking distribution line L2. Each of the compatible braking distribution lines L5, L6, L7 intersects the horizontal axis when the front wheel braking force Fbf is 3000 N, 2000 N, 1000 N. The number of compatible braking distribution lines is not limited to three, and may be one or a plurality.

When the driver operates the brake pedal 52a while the vehicle 10 is traveling, the brake ECU 50 selects any one of L7 from the normal braking distribution line L2, the regenerative braking distribution line LA, and the compatible braking distribution line L5 in accordance with the tire surface temperature Twf of the front wheel WF. Based on the selected braking distribution line, the required braking force Freq is distributed to the target value of the frictional braking force (hereinafter also referred to as "target frictional braking force") Ffrct and the target regenerative braking force Frgnt.

For example, when the required braking force Freq by the driver is 4000 N, in the regenerative improvement distribution, all of the required braking force Freq are distributed to the front wheel braking force Fbf based on the regenerative braking distribution line L4, and the rear wheel braking force Fbr is set to 0. By increasing the distribution of the target regenerative braking force Frgnt in the front wheel braking force Fbf as much as possible, it is possible to recover a large amount of regenerative electric power. The distribution ratio of the front wheel braking force Fbf and the rear wheel braking force Fbr is set to a point P1 on the regenerative braking distribution line L4.

In the normal distribution, a normal braking distribution line L2 is selected. The distribution ratio of the front wheel braking force Fbf and the rear wheel braking force Fbr to the required braking force Freq is set to a point P5 which is an intersection point between the normal braking distribution line L2 and the isodeceleration line L3. The front wheel braking force Fbf is distributed to the target regenerative braking force Frgnt and the frictional braking force Ffreft for the target front wheel.

When the compatible braking distribution line L5 is selected, when the front wheel braking force Fbf reaches 3000 N, the brake ECU 50 generates the rear wheel braking force Fbr. The distribution ratio of the front wheel braking force Fbf and the rear wheel braking force Fbr to the required braking force Freq is set to a point P2 which is an intersection point between the compatible braking distribution line L5 and the isodeceleration line L3. The distribution of the target regenerative braking force Frgnt in the required braking force Freq is smaller than the distribution of the target regenerative braking force Frgnt in the regenerative improvement distribution.

When the compatible braking distribution line L6 is selected, when the front wheel braking force Fbf reaches 2000 N, the brake ECU 50 generates the rear wheel braking force Fbr. The distribution ratio of the front wheel braking force Fbf and the rear wheel braking force Fbr to the required braking force Freq is set to a point P3 which is an intersection point between the compatible braking distribution line L6 and the isodeceleration line L3. The distribution of the target regenerative braking force Frgnt in the required braking force Freq is even smaller than the distribution in the compatible braking distribution line L5.

When the compatible braking distribution line L7 is selected, when the front wheel braking force Fbf reaches 1000 N, the brake ECU 50 generates the rear wheel braking force Fbr. The distribution ratio of the front wheel braking force Fbf and the rear wheel braking force Fbr to the required braking force Freq is set to a point P4 which is an intersection point between the compatible braking distribution line L7 and the isodeceleration line L3.

When the required braking force Freq is not changed, the distribution ratio of the front wheel braking force Fbf and the rear wheel braking force Fbr is changed from the point P1 on the isodeceleration line L3 to the point P5 via the point P2, point P3, point P4. That is, the distribution of the front wheel braking force Fbf in the required braking force Freq is reduced, and the distribution of the rear wheel braking force Fbr is increased. Accordingly, the distribution of the regenerative braking force Frgn in the required braking force Freq is reduced from the regenerative improvement distribution toward the normal distribution.

In the compatibility control, the brake ECU 50 reduces the distribution of the regenerative braking force Frgn in the required braking force Freq when it is determined that the tire surface temperature Twf tends to increase. Since the ratio of the front wheel braking force Fbf in the required braking force Freq is reduced, it is possible to reduce the stress concentration on the front wheel WF when the driver operates the brake pedal 52*a*. Therefore, the increase in the tire surface temperature Twf is suppressed, and thus the wear of the tire can be suppressed. On the other hand, since the ratio of the regenerative braking force Frgn in the required braking force Freq is reduced, the power recovery is reduced.

This control of the distribution ratio of the front wheel braking force Fbf and the rear wheel braking force Fbr suppresses an increase in the tire surface temperature Twf. If it is estimated that the tire surface temperature Twf does not exceed the reference temperature Tref during running of the vehicle 10, the brake ECU 50 returns the distribution of the regenerative braking force Frgn and the frictional braking force Ffrc to the regenerative enhanced distribution. Therefore, it is possible to suppress a decrease in the power recovery amount. In this way, in the compatibility control, the brake ECU 50 satisfies the required braking force Freq and controls the distribution of the regenerative braking force Frgn in the required braking force Freq in accordance with the tire surface temperature Twf. According to this configuration, it is possible to achieve both suppression of tire wear dust and improvement in fuel efficiency without giving a sense of discomfort to the driver.

Figure 4:
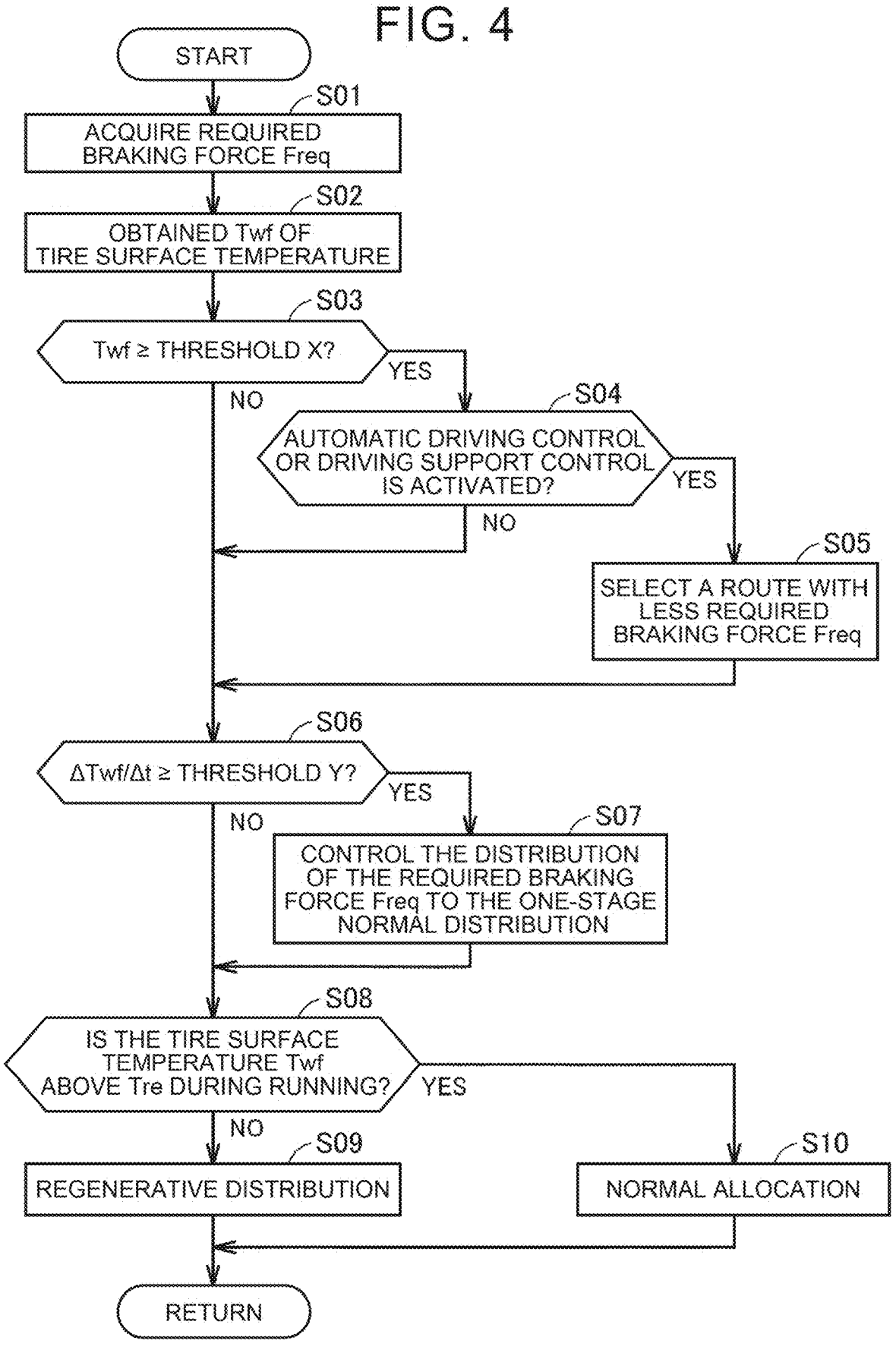
FIG. 4 is a flowchart illustrating an example of a process related to braking control according to the present embodiment.

Next, an embodiment of braking control in the brake ECU 50 will be described. FIG. 3 and FIG. 4 are flowcharts illustrating an example of a process related to braking control according to the present embodiment.

As shown in FIG. 3, in step (hereinafter, step is abbreviated as "S") 31, the brake ECU 50 determines whether or not a tire replacement has been performed. For example, determination in S31 is YES when the air pressure sensor for monitoring the air pressure of the tire of the vehicle 10 is initialized, and determination in S31 is NO when the air pressure sensor is not initialized.

When the tire replacement is executed (YES in S31), the brake ECU 50 proceeds to S32 to determine whether the replacement tire is a genuine product. For example, if a dealer of the vehicle confirms that the replacement tire is a genuine product, the dealer may write an indication to ROM of the brake ECU 50. The brake ECU 50 determines S32 based on the presence or absence of the information. When it is determined that the replacement tire is not a genuine product (NO in S32), the brake ECU 50 prohibits the execution of the compatibility control in S33. This is due to the fact that the reference thermal Tref depends mainly on the components and properties of the tread rubber of the tire, etc. When the reference temperature Tref of the original tire differs from the reference temperature Tref of the non-original tire, it is possible to avoid a situation in which the accuracy of the compatibility control deteriorates.

If tire replacement is not being performed (NO in S31) or if the replacement tire is a genuine product (YES in S32), the brake ECU 50 performs compatibility control in S34. The processing including the compatibility control of the flowchart illustrated in FIG. 4 is repeatedly executed while the vehicle 10 is traveling.

The brake ECU 50 calculates the required braking force Freq based on the brake pedal operation amount BP, the vehicle speed SPD, and the moving radii of the front wheel WF (S01). The brake ECU 50 acquires the tire surface temperature Twf of the front wheel WF (S02). The brake ECU 50 acquires the tire surface temperature Twf based on the output signal of the temperature sensor 60 or the travel result of the vehicle 10.

The brake ECU 50 determines whether the tire surface temperature Twf is greater than or equal to the threshold X (S03). The threshold X is set to a temperature lower than a reference temperature Tref of the tire of the front wheel WF. When the tire surface temperature Twf is equal to or higher than the threshold X (YES in S03), the brake ECU 50 determines whether the automated driving control or the driving assistance control of the vehicle 10 is in operation (S04). The determination of S04 can be performed, for example, based on communication between an autonomous driving system or a driving assistance system mounted on the vehicle 10 and a brake ECU 50. The autonomous driving system is configured to create a travel plan of the vehicle 10. During the operation of the automatic driving control, various types of vehicle control are executed so that the vehicle 10 travels in accordance with the created travel plan.

When the vehicle 10 is not equipped with either the autonomous driving system or the driving support system, S04 is determined to be NO. Further, S04 is determined to be NO when the vehicle 10 is equipped with the autonomous driving system or the driving support system, but the autonomous driving control or the driving support control is stopped.

When the autonomous driving control or the driving assistance control of the vehicle 10 is in operation (YES in S04), the brake ECU 50 transmits a signal indicating that the tire surface temperature Twf of the front wheel WF tends to increase to the autonomous driving system or the driving assistance system. The autonomous driving system or the driving support system changes the traveling route of the vehicle 10 to a traveling route having a small required braking force Freq in response to the reception of the signal from the brake ECU 50 (S05). As a traveling route having a small required braking force Freq, for example, a traveling route having a small number of right and left turns and a small number of slopes is selected. After the travel route is changed by S05, the process returns to S06.

When the tire surface temperature Twf is less than the threshold X (NO in S03), and when the automated driving control or the driving assistance control of the vehicle 10 is not in operation (NO in S04), the brake ECU 50 determines whether or not the increase speed of the tire surface temperature Twf is equal to or greater than the threshold Y (S06). When the travel route of the vehicle 10 is changed (S05), the brake ECU 50 determines whether or not the increase rate of the tire surface temperature Twf is equal to or greater than the threshold Y (S06). The increase rate of the tire surface temperature Twf corresponds to the increase ($\Delta$Twf/$\Delta$t) of the tire surface temperature Twf per unit time.

When the increase rate of the tire surface temperature Twf is equal to or greater than the threshold Y (YES in S06), the brake ECU 50 determines that the tire surface temperature Twf tends to increase, and reduces the distribution of the regenerative braking force Frgn in the required braking force Freq (S07). In S07, the brake ECU 50 selects a braking distribution line that is located at the one-stage normal distribution side of the currently selected braking distribution line, and determines the distribution ratio of the front wheel braking force Fbf and the rear wheel braking force Fbr based on the selected braking distribution line. That is, the brake ECU 50 increases the distribution of the rear wheel braking force Fbr in the required braking force Freq and decreases the distribution of the front wheel braking force Fbf.

For example, when the distribution ratio of the front wheel braking force Fbf and the rear wheel braking force Fbr is at the point P1 on the regenerative braking distribution line L4, the brake ECU 50 changes the distribution ratio of the front wheel braking force Fbf and the rear wheel braking force Fbr to the point P2 on the compatible braking distribution line L5. When it is determined that the tire surface temperature Twf tends to increase even after the distribution ratio of the front wheel braking force Fbf and the rear wheel braking force Fbr is changed to the point P2, the brake ECU 50 further changes the distribution ratio of the front wheel braking force Fbf and the rear wheel braking force Fbr to the point P3 on the compatible braking distribution line L6.

Next, the brake ECU 50 predicts the transition of the tire surface temperature Twf during the traveling of the vehicle 10 based on the tire surface temperature Twf at the present time and the traveling schedule of the vehicle 10. The travel schedule of the vehicle 10 includes information on the travel scheduled distance and travel conditions (travel route, vehicle speed, weather, outside air temperature, and the like) of the vehicle 10. The traveling conditions of the vehicle 10 can be acquired by using, for example, a GPS. For example, the brake ECU 50 predicts the transition of the tire surface temperature Twf by applying the travel schedule of the vehicle 10 to the look-up table MapTwf defining the relation between the travel result of the vehicle 10 and the tire surface temperature Twf. The brake ECU 50 estimates whether the tire surface temperature Twf exceeds the reference temperature Tref during running of the vehicle 10 based on the predicted transition of the tire surface temperature Twf (S08).

When it is estimated that the tire surface temperature Twf exceeds the reference temperature Tref (YES in S08) during running of the vehicle 10, the brake ECU 50 selects (normally allocates) the normal braking distribution line L2 by S10. The brake ECU 50 determines a distribution ratio of the front wheel braking force Fbf and the rear wheel braking force Fbr based on the normal braking distribution line L2.

On the other hand, when it is estimated that the tire surface temperature Twf does not exceed the reference temperature Tref during running of the vehicle 10 (NO in S08), the brake ECU 50 selects the regenerative braking distribution line L4 in S09 (regenerative improvement distribution). The brake ECU 50 determines a distribution ratio of the front wheel braking force Fbf and the rear wheel braking force Fbr based on the regenerative braking distribution line L4.

Figure 5:
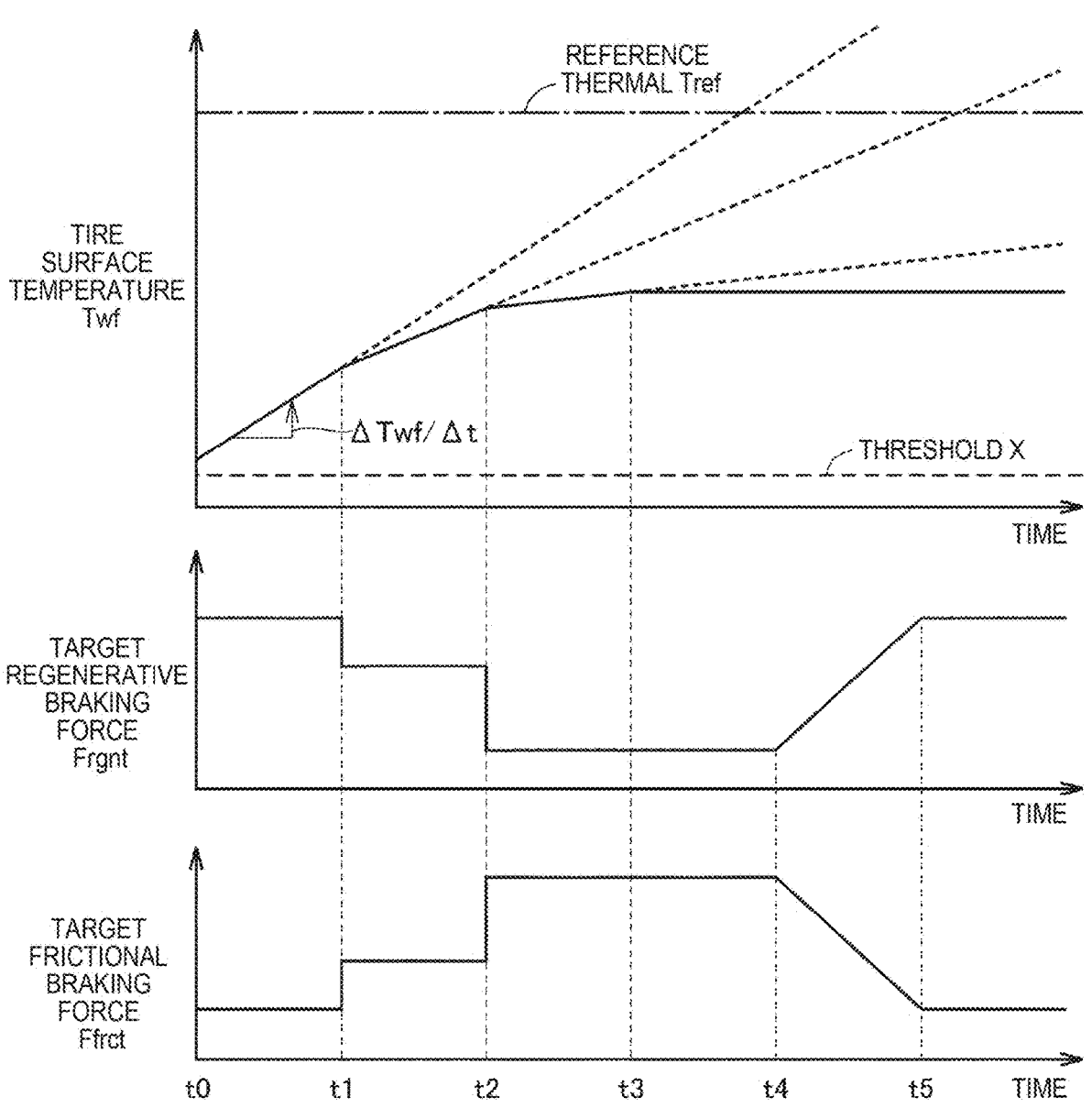
FIG. 5 is a diagram showing the time-change of the required braking force, regenerative braking force, frictional braking force and tire surface temperature of the front wheel at the time of execution of compatibility control.

FIG. 5 is a diagram illustrating temporal changes in the target regenerative braking force Frgnt, the target frictional braking force Ffrct, and the tire surface temperature Twf of the front wheel WF when the compatibility control is executed. In FIG. 5, it is assumed that the required braking force Freq based on the brake pedal operation amount BP is constant. The solid line represents a temporal change in the tire surface temperature Twf, and the dotted line represents a transition (predicted) of the tire surface temperature Twf during running.

When the tire surface temperature Twf tends to increase during the traveling of the vehicle 10 in the regenerative improvement distribution (YES in S06), the distribution of the target regenerative braking force Frgnt in the required braking force Freq decreases and the distribution of the target frictional braking force Ffrct increases (t2 from the time t1). Further, when it is estimated that the tire surface temperature Twf exceeds the reference temperature Tref during traveling of the vehicle 10 (YES in S08), the distribution of the target regenerative braking force Frgnt is further reduced and the distribution of the target frictional braking force Ffrct is further increased (from the time t2 to t4) according to the normal distribution.

When it is determined that the tire surface temperature Twf does not exceed the reference temperature Tref during running of the vehicle 10 (NO at S08), the distribution of the target regenerative braking force Frgnt in the required braking force Freq is increased and the distribution of the target frictional braking force Ffrct is decreased. As a result, it is returned to the regeneration improvement distribution. In the embodiment of FIG. 5, the distribution of the target regenerative braking force Frgnt and the target frictional braking force Ffrct changes at a predetermined rate of change.

As described above, according to the vehicle according to the present embodiment, while satisfying the required braking force Freq, on the basis of the tire surface temperature Twf of the front wheel WF which is the regenerative braking wheel, the distribution of the regenerative braking force Frgn in the required braking force Freq is controlled so that the tire surface temperature Twf does not exceed the reference temperature Tref during traveling of the vehicle. According to this configuration, it is possible to achieve both suppression of tire wear dust and improvement of fuel efficiency.

Modifications (1) In the above-described embodiment, a configuration has been described in which, when the autonomous driving control or the driving support control is in operation in a vehicle equipped with the autonomous driving system or the driving support system, the traveling route of the vehicle is changed to a traveling route having a small required braking force Freq in response to the tire surface temperature Twf of the front wheel WF exceeding the threshold X. Instead of this configuration, a configuration may be adopted in which a traveling route having a small required braking force Freq is recommended to the user by using a notification device mounted on the vehicle.

Figure 6:
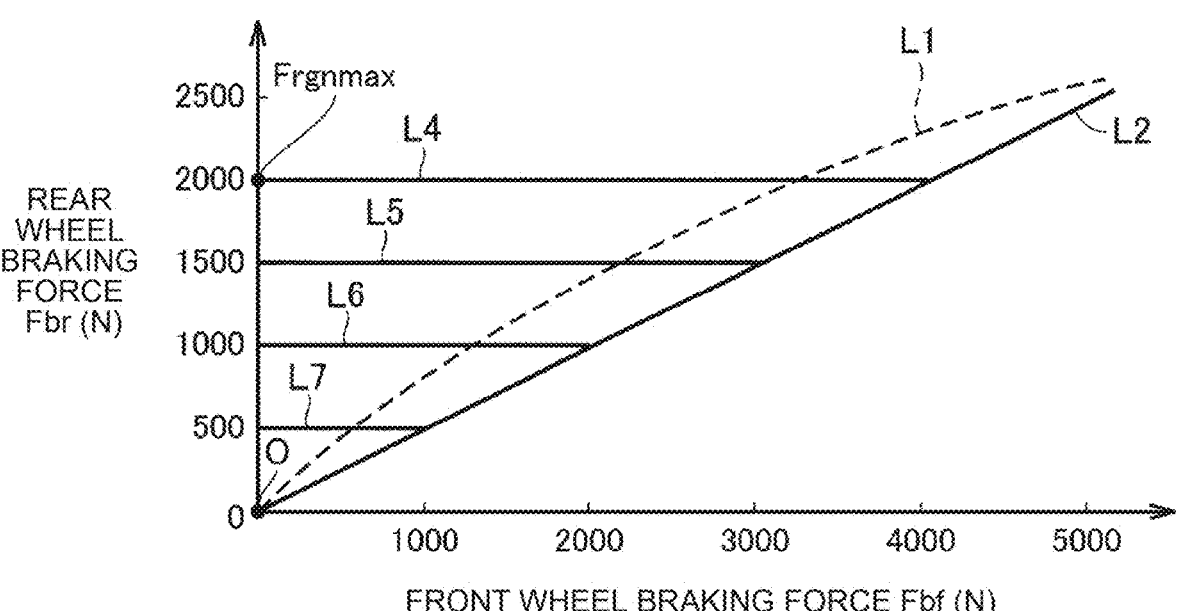
FIG. 6 is a diagram illustrating a distribution ratio between the front wheel braking force and the rear wheel braking force.

(2) In the above-described embodiment, the braking control in the vehicle in which the front wheel WF is the regenerative braking wheel has been described, but the braking control according to the present disclosure can also be applied to the vehicle and the four-wheel drive vehicle in which the rear wheel WR is the regenerative braking wheel. For example, a brake ECU of a vehicle in which the rear wheel WR is a regenerative braking wheel can perform compatibility control using the distribution ratios of the front wheel braking force and the rear wheel braking force illustrated in FIG. 6.

It should be understood that the embodiments disclosed herein are illustrative and non-restrictive in all respects. It is intended that the scope of the disclosure be defined by the appended claims rather than the foregoing description, and that all changes within the meaning and range of equivalency of the claims be embraced therein.

What is claimed is:

1. A vehicle comprising:
a plurality of wheels including a front wheel;
a regenerative braking device configured to apply a regenerative braking force to the front wheel;
a friction braking device configured to apply a friction braking force to the plurality of wheels;
an autonomous driving system configured to prepare a travel plan for the vehicle; and a processor configured to control a braking force for the vehicle, acquire, from a first sensor, a surface temperature of a tire of the front wheel during travel of the vehicle, acquire, from a second sensor, a brake pedal operation amount, acquire, from a third sensor, speed of the vehicle, calculate a required braking force based on the brake pedal operation amount and the speed of the vehicle, distribute the required braking force to the regenerative braking force and the friction braking force, and distribute the regenerative braking force to the required braking force based on the surface temperature such that the surface temperature of does not exceed a reference temperature determined in advance during the travel of the vehicle, wherein the processor is further configured to control the travel of the vehicle according to an instruction from the autonomous driving system, and the autonomous driving system is configured to change a travel route of the vehicle to a travel route with a smaller required braking force than a travel route at a present time when the surface temperature exceeds a threshold temperature determined in advance.

\*   \*   \*   \*   \*